Figure 1:
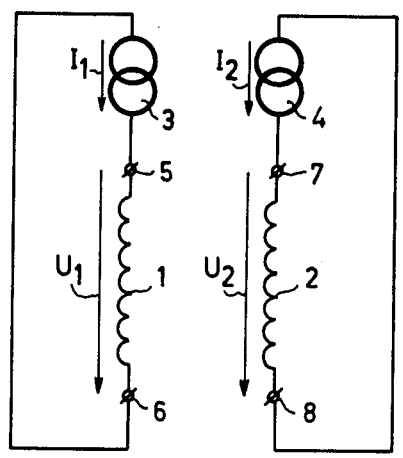

United States Patent [19]

Goddijn

[11] 4,112,345
[45] Sep. 5, 1978

[54] STEPPING MOTOR WITH ENERGIZING CIRCUIT

[75] Inventor: Bernardus Henricus Antonius Goddijn, Eindhoven, Netherlands

[73] Assignee: U.S. Philips Corporation, New York, N.Y.

[21] Appl. No.: 764,027

[22] Filed: Jan. 31, 1977

[30] Foreign Application Priority Data

Feb. 24, 1976 [NL] Netherlands ............................ 7601844

[51] Int. Cl.$^2$ .............................................. H02P 1/40
[52] U.S. Cl. .................................... 318/696; 318/254; 318/138
[58] Field of Search ................ 318/696, 685, 254, 138; 310/49

[56] References Cited

U.S. PATENT DOCUMENTS 3,466,520  9/1969  Aylikci et al. ........................ 318/696

*Primary Examiner*—Herman J. Hohauser
*Attorney, Agent, or Firm*—Frank R. Trifari; Robert S. Smith

[57] ABSTRACT

A stepping motor provided with an energizing circuit for simultaneously energizing two phase windings from current sources. For actively damping the rotor movements an active network has been provided which measures the difference between the voltages across the two phase windings and in accordance with a suitably selected function converts it into two currents which are in phase opposition to each other, and which are applied to the two phase windings.

8 Claims, 3 Drawing Figures

STEPPING MOTOR WITH ENERGIZING CIRCUIT

The invention relates to a stepping motor with energizing circuit for the stepwise energization of two phases at a time, provisions being made for improving the damping of the rotor movement around the position of equilibrium which corresponds to the relevant energizing condition.

The invention also relates to an energizing circuit for said stepping motor.

The journal "Proceedings of the IEE", Vol. 122, No. 8, August 1975, pages 819–824 contains an article by A. Hughes and P. J. Lawrenson in which the electromagnetic damping for stepping motors is described. It is demonstrated that the damping properties of the motor can be improved by adaptation of motor parameters such as the resistance and self-inductance of the phase windings.

Generally, adaptation of motor parameters for the benefit of the damping properties is not an attractive solution, because other motor properties are also determined by these parameters. In the case of stepping motors which are energized from a source with a comparatively high internal resistance relative to the impedance of the phase windings, which is advantageous in respect of the maximum attainable stepping frequency, this even has little effect.

It is an object of the invention to provide a damping method for current energized stepping motors, requiring no motor-adaptation, and the invention is characterized in that the energizing circuit comprises sources with a comparatively high internall resistance relative to the phase windings for supplying energizing currents to the two phases to be energized, and an active network for generating two currents which are substantially in phase opposition and whose intensity is a function of the difference between the voltages across the two phases, which two currents which are in phase opposition to each other can each be applied to one of the phase windings, in such a way that the rotor movement is actively damped.

The energizing circuit for a stepping motor of the aforementioned type is characterized in that the energizing circuit comprises a first and a second connection terminal to which the phase windings to be energized can be connected, and an active network for generating two currents which are substantially in phase opposition and whose intensity is a function of the difference between the voltages at the two connection terminals, which two currents which are in phase opposition to each other are available at connection terminals.

The invention is based on the recognition that in the case of two-phase energized stepping motors the difference between the voltages across the energized phases is a measure of the departure of the rotor from its position of equilibrium and that in accordance with a suitably selected function currents can be derived therefrom which can be applied to the phases in order to exert an additional damping force on the rotor.

In respect of the active network it is advantageous in accordance with a further characteristic feature of the invention that the active network comprises a voltage-current converter with an input and an output, the relationship between the voltage U across the input and the current I at the output being $U = ZI$, where Z is a phase impedance with an angle between $-90°$ and $+180°$, first means for deriving the input voltage U which is substantially in phase with the difference $U_1 - U_2$ between the voltage $U_1$ across the one phase winding and the voltage $U_2$ across the other phase winding, and second means for supplying a current which is substantially in phase with the output current I to the one phase winding and a current which is substantially in phase opposition thereto to the other phase winding.

A suitable embodiment of said voltage-current converter is characterized in that the voltage-current converter includes an amplifier with an inverting and a non-inverting input to which the voltage U is applied as a difference voltage, and with an output which is connected to a point of fixed voltage via an impedance which corresponds to the impedance Z.

A further embodiment in accordance with the invention is characterized in that the sources for supplying the energizing currents comprise a first and a second amplifier to whose inputs a reference signal is applied and of which outputs lead to the first and the second phase winding respectively, the two amplifiers receiving negative feedback via means which detect the currents in said windings, that the first means for deriving the voltage U comprise a coupling between the output of the first amplifier and the noninverting input of the differential amplifier, and a coupling between the output of the second amplifier and the inverting input of the differential amplifier, and the second means for supplying the current I comprise a positive-feedback circuit between a current detector, which detects the current through said impedance, and the first amplifier, and a negative-feedback circuit between said current detector and the second amplifier.

Figure 2:
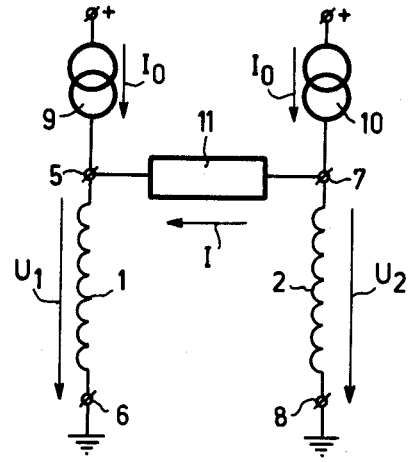
Figure 3:
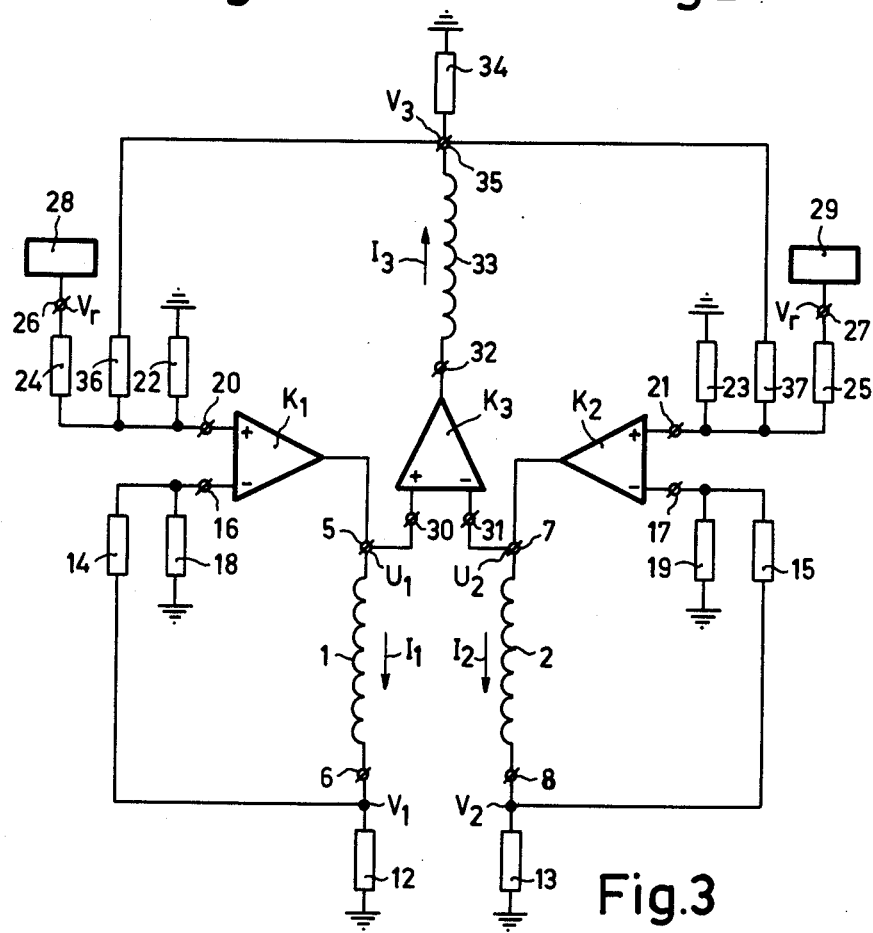

The invention will be described in more detail with reference to the drawing in which FIG. 1 schematically represents two phase windings with current sources so as to define the voltages and currents, FIG. 2 is a circuit diagram of a stepping motor with energizing circuit in accordance with the invention, and FIG. 3 is an embodiment of an energizing circuit in accordance with the invention.

The invention is applicable to any type of electromechanical stepping motor suitable for two-phase energization. Moreover, the stepping method of the motor is irrelevant for the invention. To illustrate the invention only that part of the energizing circuit will be described which is active during the energization of two specific phases.

FIG. 1 shows two coils 1 and 2 corresponding to two energized phases. The coils may be either stator coils or rotor coils. The coils 1 and 2 are energized from current sources 3 and 4 respectively. The current source 3 carries a current $I_1$ and the current source 4 a current $I_2$. The current $I_1$ produces a voltage $U_1$ across coil 1 and the current $I_2$ a voltage $U_2$ across the coil 2. The various voltages and currents are always defined with respect to the direction of the energizing currents, so that the winding direction of the coils is irrelevant in the calculations.

The current sources 3 and 4 carry currents $I_1$ and $I_2$ respectively, which satisfy the equations:

$$I_1 = I_0 + I$$
$$I_2 = I_0 - I \qquad (1)$$

where $I_0$ are the energizing currents and $I$ the currents which determine the damping. The current $I$ is derived from the voltages across the coils 1 and 2 in accordance with the function:

$$U_1 - U_2 = IR + L\frac{dI}{dt} = ZI \qquad (2)$$

where R is an ohmic quantity, L a coefficient of self-inductance and $d/dt$ the first derivitive with respect to time. If by means of these expressions for the currents $I_1$ and $I_2$ the damping properties of the motor are calculated, it is found that these damping properties can be optimized by a suitable choice of the parameters L and R. In order to avoid resonant-rise symptons, the quantity R should always be smaller than the sum of the internal resistances of the two energized coils. The optimum values for R and L for each type of motor can be determined both empirically and theoretically.

The impedance Z which defines the relationship between $U_1 - U_2$ and I should have a substantially inductive character. In the case of motors where the self-inductance is comparatively high and the internal resistance is comparatively low, the quantity L must be positive and the quantity R, provided that it is comparatively small, is non-critical and may even be negative. In the case of motors with a comparatively low self-inductance and a comparatively high internal resistance, such as motors with a self-supporting rotor winding, R should be positive and the quantity L, provided that it is comparatively small, is non-critical and may even be negative. Therefore it may be assumed that the argument for the impedance Z lies between $-90°$ and $+180°$.

FIG. 2 shows a circuit diagram of an energizing circuit in accordance with the invention. The phase windings 1 and 2 are supplied with energizing currents $I_O$ from sources 9 and 10 which have a high internal resistance relative to the impedance of the phase windings. Between the connecting points 5 and 7 of the phase windings 1 and 2 and the energizing current sources 9 and 10 an active impedance 11 is included which depending on the voltage difference $U_1 - U_2$ generates the current I in accordance with the desired function. The currents which flow in the phase windings 1 and 2 and than $I_0 + I$ and $I_0 - I$ respectively. In principle, neither the energizing currents from the sources 9 and 10 nor the damping currents I in the two phase windings, which are in phase opposition, need be equal.

If one of the two windings is wound oppositely to the other winding, the energizing current for the one winding will generally have a polarity which is opposite to the polarity of the energizing current for the other winding. The same then also applies to the voltages across the windings 1 and 2. To measure the voltage difference $U_1 - U_2$ it is then not possible to simply include an active impedance 11 between points 5 and 7.

FIG. 3 shows an embodiment of an energizing circuit in accordance with the invention. The phase windings 1 and 2 are included, in series with the measuring resistors 12 and 13 respectively, between the outputs of differential amplifier $K_1$ and $K_2$ respectively and a point of fixed potential, in the present case earth potential. The connection points 6 and 8 of the phase windings 1 and 2 respectively and the measuring resistors 12 and 13 respectively are connected via resistors 14 and 15 to the inverting inputs 16 and 17 of the differential amplifiers $K_1$ and $K_2$ respectively. These inputs 15 and 16 are connected to the point of fixed potential via resistors 18 and 19 respectively. The non-inverting inputs 20 and 21 of the differential amplifiers $K_1$ and $K_2$ respectively are connected to the point of fixed potential via resistors 22 and 23 respectively and to the outputs 26 and 27 of the sources 28 and 29 respectively via resistors 24 and 25 respectively, which sources, if the phase windings 1 and 2 are to be energized, produce a suitable reference voltage at their outputs. Point 5 of phase winding 1 is connected to the non-inverting input 30 of a differential amplifier $K_3$ whose inverting input 31 is connected to point 7 of phase winding 2. The output 32 of the differential amplifier $K_3$ is connected to the point of fixed potential via a series-connection of an inductance 33 and a resistor 34. The connection point 35 of the inductance 33 and the resistor 34 is connected to the non-inverting input 20 of the differential amplifier $K_1$ via a resistor 36 and to the inverting input 17 of the differential amplifier $K_2$ via a resistor 37.

The differential amplifiers $K_1$ and $K_2$ control the currents which flow through the phase windings 1 and 2 in such a way that, provided that the gain factors of the differential amplifier are sufficiently high, the voltages at their inverting inputs 16 and 17 respectively are equal to the voltages at their non-inverting inputs 20 and 21 respectively.

If in order to illustrate the operation it is assumed that points 6, 8, 26, 27 and 35 are at voltages $V_1$, $V_2$, $V_r$, $V_r$ and $V_3$ relative to the point of fixed potential, that the resistors 14, 15, 19, 22, 24, 25, 36 and 37 all have a value $R_1$ and that the resistors 18 and 23 have a value $\frac{1}{2} R_1$, the said control yields the following relationship, for which it is assumed that the input impedances of the differential amplifiers $K_1$ and $K_2$ are comparatively high relative to the resistance $R_1$:

$$V_1 = V_r + V_3$$

$$V_2 = V_r - V_3 \qquad (3)$$

If currents $I_1$ and $I_2$ flow through the phase windings 1 and 2 respectively and the measuring resistors 12 and 13 have the value $R_0$, then:

$$I_1 = \frac{1}{R_0}(V_r + V_3) \qquad (4)$$

$$I_2 = \frac{1}{R_0}(V_r - V_3)$$

If the value $R_0$ of the measuring resistors 12 and 13 is small relative to the impedance of the phase windings 1 and 2, the voltages at points 5 and 6 are substantially equal to the voltages $U_1$ and $U_2$ across the phase windings 1 and 2 respectively. When it is furthermore assumed that the gain factor of the differential amplifier $K_3$ is A, that the value of the inductance 33 equals $L_3$ and that the value of the resistor 34 is $R_3$ and is comparatively small relative to the resistance $R_1$, the following applies to the output current $I_3$ of the differential amplifier $K_3$:

$$U_1 - U_2 = \frac{R_3}{A}I_3 + \frac{L_3 dI_3}{A dt} \qquad (5)$$

For the voltage $V_3$ the following equation is then valid:

$$V_3 = I_3 R_3 \qquad (6)$$

Combination of the expressions (4), (5) and (6) and comparison with expression (1), gives the following expressions for the energizing current $I_0$ and the damping current I:

$$I_0 = \frac{V_r}{R_0} \qquad (7)$$

$$I = \frac{R_3}{R_0} I_3$$

$$U_1 - U_2 = \frac{R_0}{A} I + \frac{R_0 L_3}{R_3 A} \frac{dI}{dt}$$

Comparison of expression (7) with expression (2) yields:

$$R = \frac{R_0}{A} \text{ and } L = \frac{R_0 L_3}{R_3 A} \qquad (8)$$

It will be evident that the invention is not limited to the described energizing circuit. For each type of stepping motor the most suitable embodiment of an energizing circuit in accordance with the invention can be found. It is for example also possible to apply the invention to stepping motors with bifilar phase windings. The energizing currents $I_0$ may then be applied to one of the windings of the bifilar windings and the damping currents, taking into account the winding direction, to the other winding. It is alternatively possible to apply the currents $I_0 + I$ and $I_0 - I$ to one of the windings of the bifilar windings and to measure the voltages $U_1$ and $U_2$ across the other winding.

In FIG. 3 the coils are permanently connected to the circuit via the connection terminals 5, 6, 7 and 8. In reality, switches may be incorporated (in the case of a motor with more than two phase windings) for including other phase windings between these terminals.

What is claimed is:

1. A stepping motor and energizing circuit which comprises: a stepping motor having a rotor, first and second phase windings, and means for the stepwise energization of said first and second phase windings simultaneously including first and second sources having a high internal resistance relative to said first and second phase windings, said sources supplying energizing currents to said first and second phase windings to be energized, and an active network for generating a first current at a first output and a second current at a second output, said first and second currents being substantially in phase opposition and each having a magnitude which is a function of the difference between the voltages across said first and second phase windings, said first output being connected to said first phase winding and said second output being connected to said second phase winding to actively damp movement of said rotor.

2. Apparatus as claimed in claim 1 wherein said active network comprises a voltage-current converter with a first input and an output, the relationship between the voltage U across said first input and the current I at the output being $U = ZI$, where Z is an impedance with a phase angle between $-90°$ and $+180°$, first means for deriving the input voltage U substantially in phase with the difference $U_1 - U_2$ where $U_1$ is the voltage across said first phase winding and $U_2$ is the voltage across the said second phase winding, and second means for supplying a current which is substantially in phase with the output current I to the first output connected to said first phase winding and a current which is substantially in phase opposition thereto to said second output.

3. Apparatus as claimed in claim 2 further including means for producing a fixed voltage and wherein said voltage-current converter input is a differential amplifier with an inverting input and a non-inverting input to which the voltage U is applied as a difference voltage, and said output is connected to said means for producing a fixed voltage and said connection is via an impedance which corresponds to the impedance Z.

4. Apparatus as claimed in claim 3 wherein said sources for supplying the energizing currents comprise respectively first and a second amplifiers, each having inputs, said apparatus further including means for generating a reference signal connected to said inputs, said outputs being connected to said first and second phase windings respectively, means for detecting current in each phase winding, said first and second amplifiers receiving negative feedback via said means for detecting current in each phase winding, said first means for deriving the voltage U comprising a coupling between the output of said first amplifier and the non-inverting input of said differential amplifier, and a coupling between the output of said second amplifier and the inverting input of the differential amplifier, and said second means for supplying a current which is substantially in phase with the output current I comprise a current detector which detects the current through said impedance, and a positive-feedback circuit between said current detector and said first amplifier, and a negative feedback-circuit between said current detector and said second amplifier.

5. An energizing circuit for an associated stepping motor having first and second phase windings characterized in that the energizing circuit comprises first and second connection terminals for connection to the associated first and second phase windings to be energized and an active network for generating a first current at a first output and a second current at a second output which first and second currents are substantially in phase opposition and whose magnitude is a function of the difference between the voltages at the two connection terminals, first output being connected to the said connection terminal and said second output being connected to said second connection terminal.

6. An energizing circuit as claimed in claim 5, characterized in that the active network comprises a voltage-current converter with a first input and an output, the relationship between the voltage U across said first input and a current I at the output being $U = ZI$, where Z is an impedance with a phase angle between $-90°$ and $+180°$, first means for deriving the voltage U substantially in phase with the difference $U_1 - U_2$ where $U_1$ is the voltage across the first associated phase winding and $U_2$ is the voltage across the second associated winding and second means for supplying a current which is substantially in phase with the output current I to said first output and a current which is substantially in phase opposition thereto to said second output.

7. An energizing circuit as claimed in claim 6 further including means for producing a fixed voltage and wherein said voltage-current converter comprises a differential amplifier with an inverting and a non-inverting input to which the voltage U is applied as a difference voltage, and said output is connected to said means for producing a fixed voltage via an impedance which corresponds to the impedance Z.

8. An energizing circuit as claimed in claim 7 wherein said circuit further includes a third and a fourth connection terminal for connecting associated means which enable the currents which flow through the associate first and second phase windings to be detected, said sources for supplying the energizing currents comprising a first and a second amplifier, said first and second amplifiers each having inputs and outputs, said inputs being connected to a reference signal and said outputs being connected to said first and said second connection terminals respectively, said two amplifiers being connected to said third and the fourth connection terminals respectively so as to obtain negative feedback, said first means for deriving the voltage U comprise a coupling between said output of said first amplifier and the non-inverting input of said differential amplifier and the coupling between the output of said second amplifier and said inverting input of the differential amplifier, and said second means for supplying the current I comprise a current detector which detects the current through said impedance, a positive-feedback circuit between said current detector, and said first amplifier, and a negative-feedback circuit between said current detector and said second amplifier.

* * * * *